Dec. 13, 1960  F. J. HIBBS, JR  2,963,876
VACUUM COOLING APPARATUS
Filed Oct. 21, 1957  6 Sheets-Sheet 1
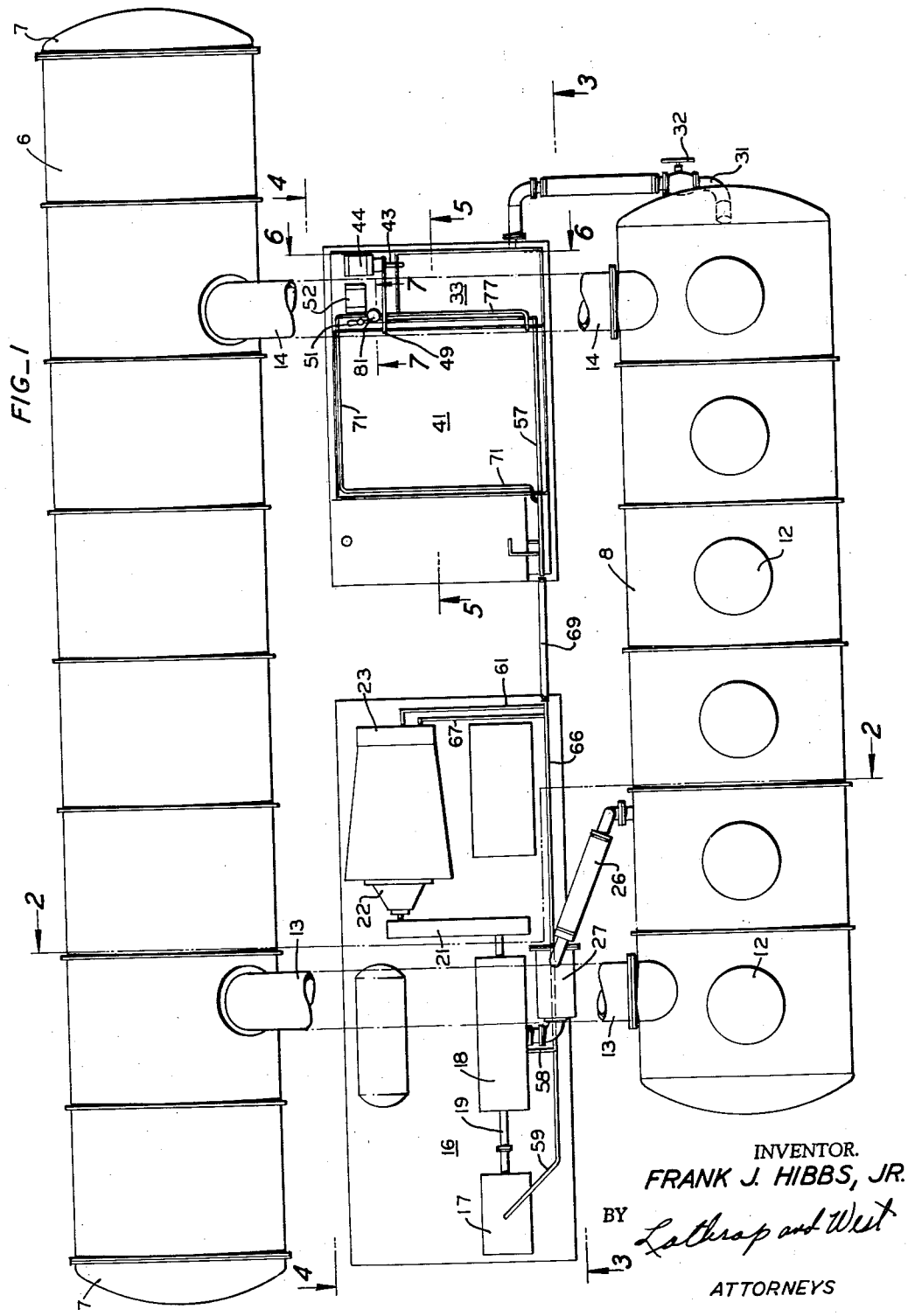
INVENTOR.
FRANK J. HIBBS, JR.
BY Lathrop and West
ATTORNEYS Dec. 13, 1960 F. J. HIBBS, JR 2,963,876
VACUUM COOLING APPARATUS
Filed Oct. 21, 1957 6 Sheets-Sheet 2
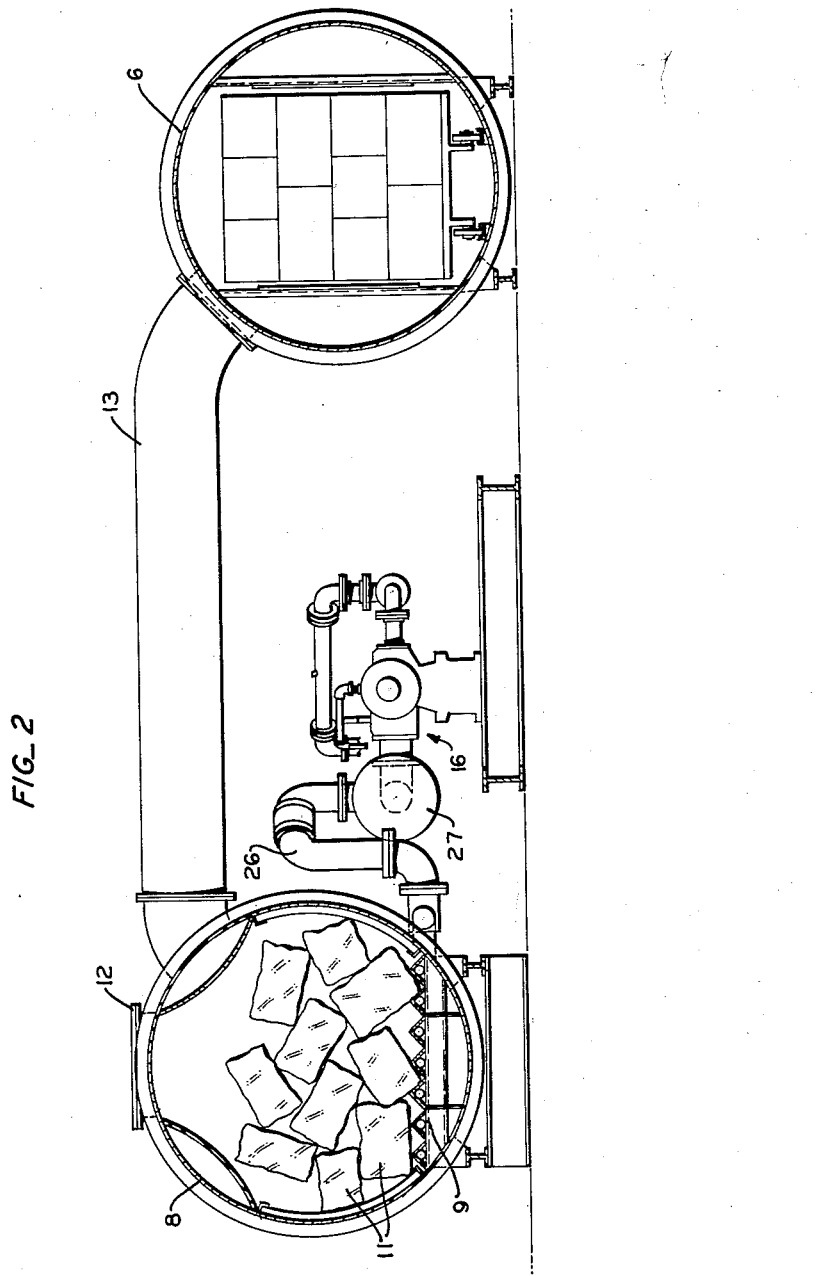
FIG_2
INVENTOR.
FRANK J. HIBBS, JR.
BY
*Lathrop and West*
ATTORNEYS Dec. 13, 1960  F. J. HIBBS, JR  2,963,876
VACUUM COOLING APPARATUS
Filed Oct. 21, 1957  6 Sheets-Sheet 3
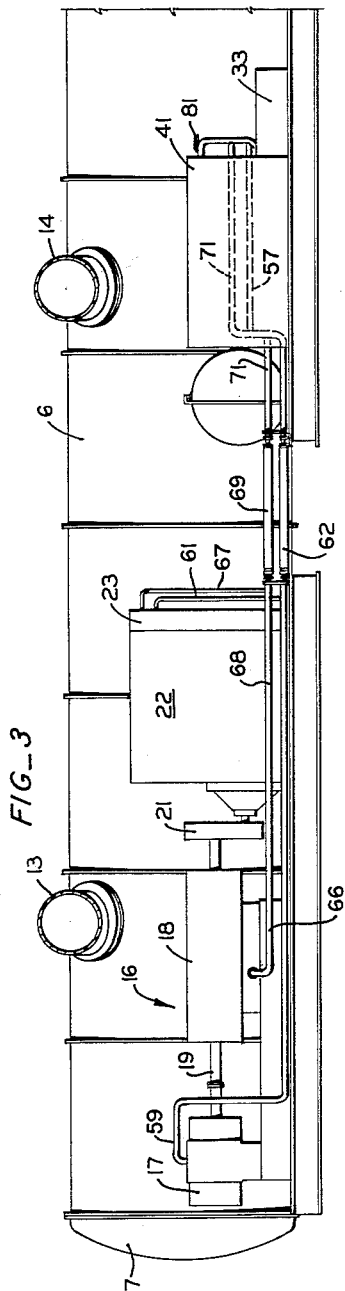
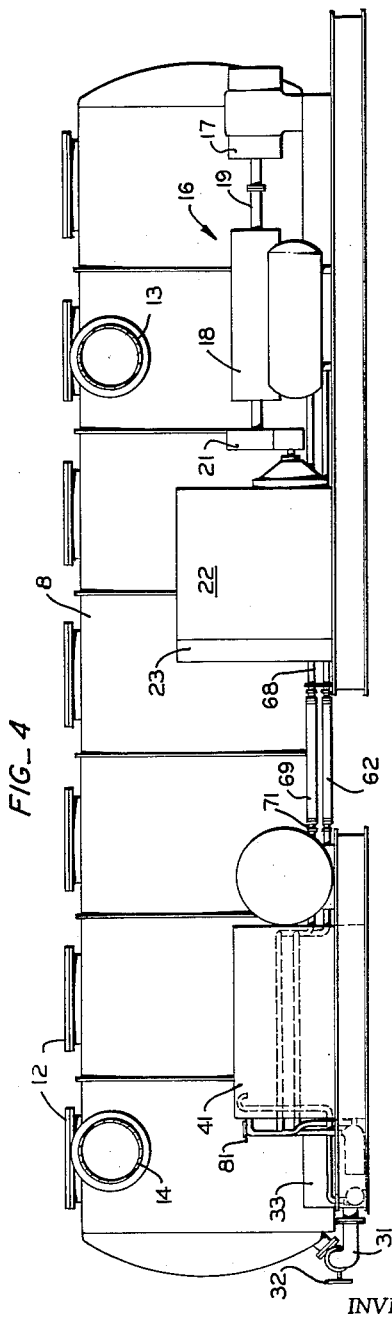
INVENTOR.
FRANK J. HIBBS, JR.
BY Lothrop and West
ATTORNEYS

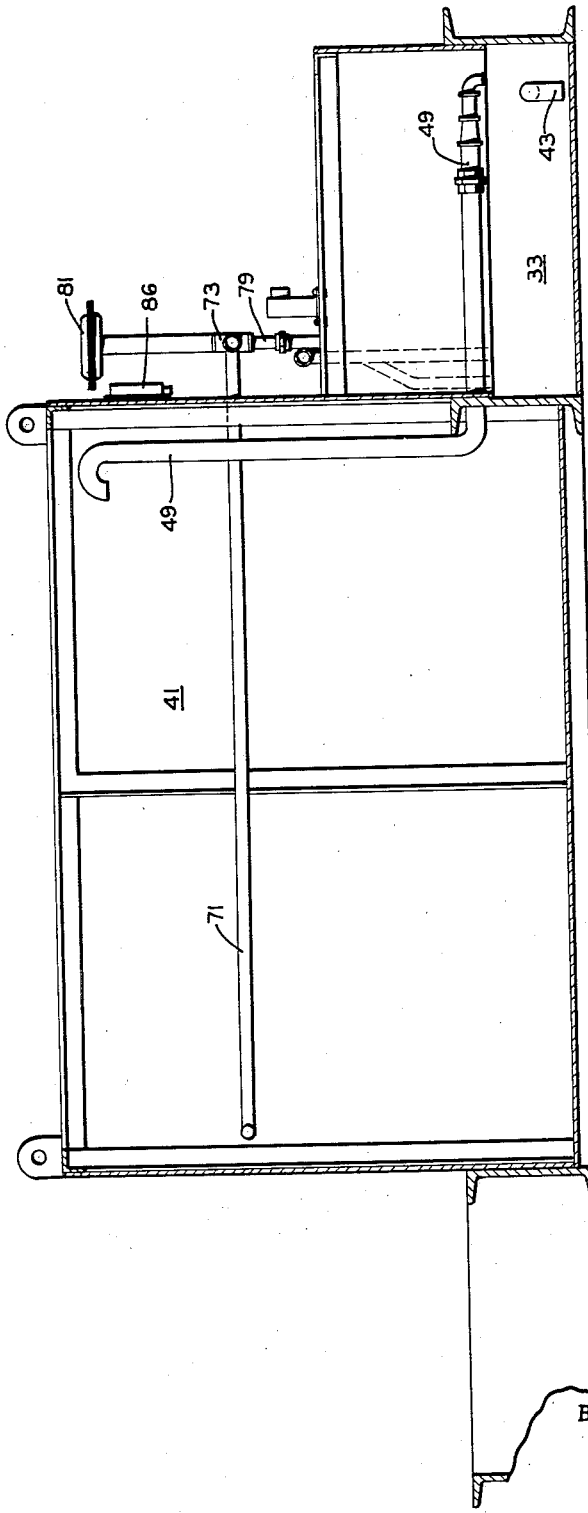

Dec. 13, 1960
F. J. HIBBS, JR
2,963,876
VACUUM COOLING APPARATUS
Filed Oct. 21, 1957
6 Sheets-Sheet 5
FIG_6
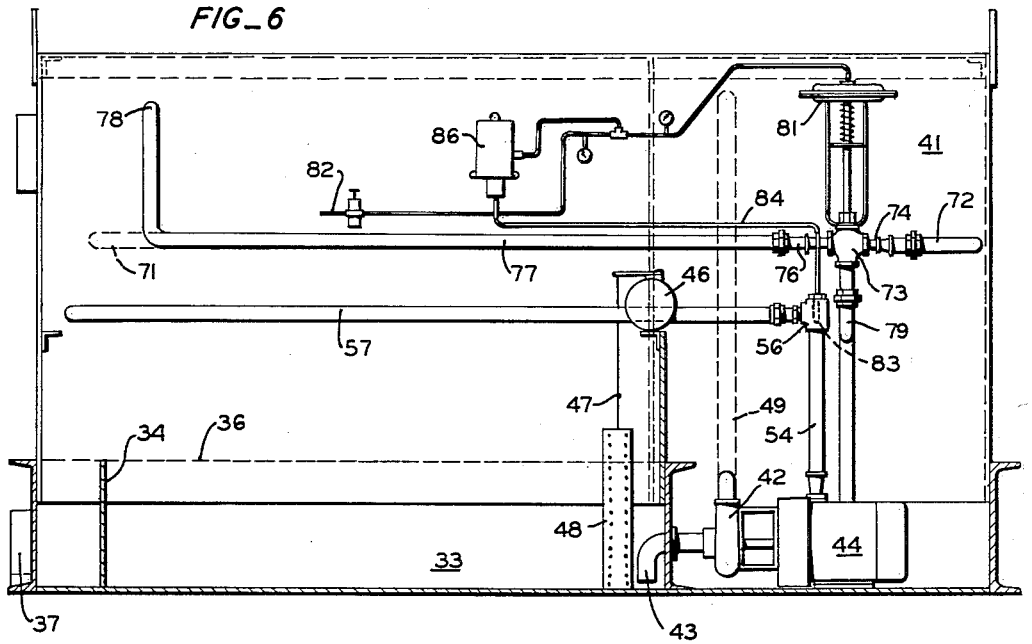
FIG_7
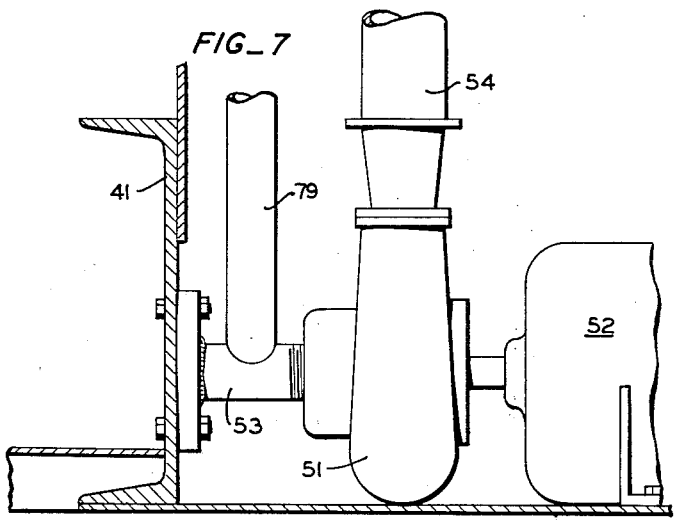
INVENTOR.
FRANK J. HIBBS, JR.
BY *Lothrop and West*
ATTORNEYS Dec. 13, 1960 F. J. HIBBS, JR 2,963,876
VACUUM COOLING APPARATUS
Filed Oct. 21, 1957 6 Sheets-Sheet 6
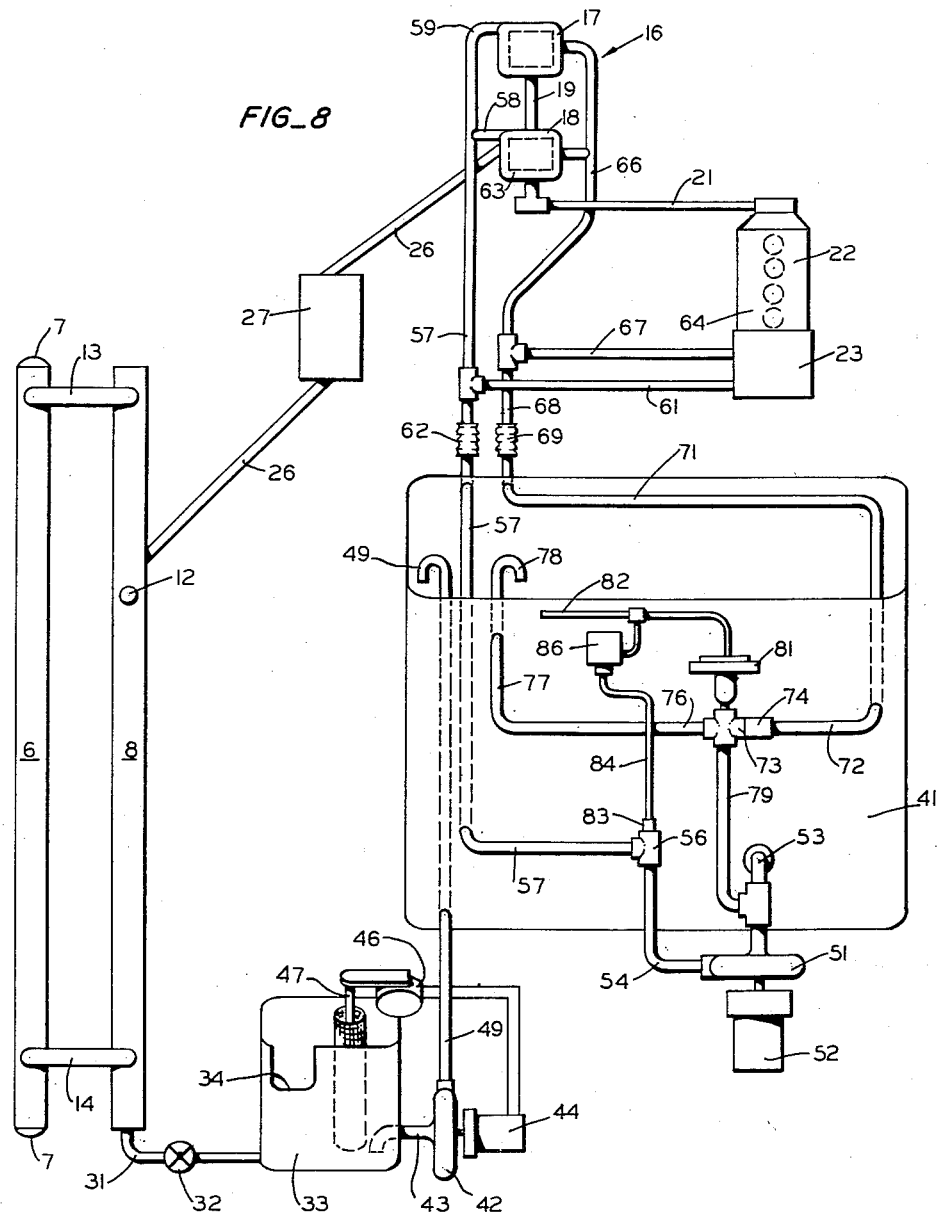
FIG_8
INVENTOR.
FRANK J. HIBBS, JR.
BY Lothrop & West
ATTORNEYS

United States Patent Office 2,963,876
Patented Dec. 13, 1960

2,963,876
VACUUM COOLING APPARATUS
Frank J. Hibbs, Jr., Inglewood, Calif., assignor to Associated Refrigerating Engineers, a corporation
Filed Oct. 21, 1957, Ser. No. 691,212
4 Claims. (Cl. 62—173)

My invention relates to means largely used for the cooling of produce as it is removed from the fields and prior to shipment. Devices of this sort have come into widespread use in various agricultural areas within the last few years. In the present instance it is primarily an object of the invention to provide an effective unit of substantial size yet one which is portable or at least semi-portable in order that it can be moved from one area to another as various crops are available from time to time.

Another object of the invention is to provide such an apparatus which is substantially self contained so that it can be utilized in various different locations or environments and without the necessity of having public power or the like immediately available.

A still further object of the invention is to provide a cooling apparatus effective to operate over a relatively wide range of capacity.

Another object of the invention is to provide an apparatus of the sort indicated which is thermally economical and which can be operated for indefinite periods virtually on a self contained basis.

A still further object of the invention is to provide a vacuum cooling apparatus in which water ice, originally in block form, is utilized as a heat absorber.

A still further object of the invention is in general to provide an improved vacuum cooling apparatus.

Other objects, together with the foregoing, are attained in the embodiment of the apparatus described in the accompanying description and disclosed in the accompanying drawings in which:

Figure 1 is a plan of a vacuum cooling apparatus constructed in accordance with the invention.

Figure 2 is a cross-section the planes of which are indicated by the line 2—2 of Figure 1.

Figure 3 is a cross-section the plane of which is indicated by the line 3—3 of Figure 1 and with part of the structure broken away.

Figure 4 is a cross-section of the structure, the plane of section being indicated by the line 4—4 of Figure 1.

Figure 5 is a cross-section to an enlarged scale, the plane of section being indicated by the line 5—5 of Figure 1.

Figure 6 is a cross-section to an enlarged scale, the plane of section being indicated by the line 6—6 of Figure 1.

Figure 7 is a detail in cross-section, the plane of section being indicated by the line 7—7 of Figure 1.

Figure 8 is a diagrammatic showing of the structure with particular reference to the piping.

While the vacuum cooling apparatus of the invention can be embodied in a number of different forms and configurations to fit it for especially defined services, it has been successfully incorporated on a commercial scale substantially as shown herein.

In this form of device there is provided a vacuum chamber 6, sometimes referred to as a produce chamber, which is an elongated, circular-cylindrical tube resting on or close to the ground. The tube is provided interiorly with accommodations for trucks or pallets holding the produce to be cooled and is likewise provided at one or both ends with a door 7 or other means for ingress or egress. The chamber 6 is capable of withstanding atmospheric pressure under a relatively high vacuum and when closed is air tight. The vacuum chamber 6 is usually of a size so that it can by itself be hauled by highway transport when disconnected from the remaining structure.

In the usual arrangement there is provided also a cooling chamber or ice chamber 8. This is of circular-cylindrical configuration, is parallel to the chamber 6 and is likewise disposed on or near the ground. The chamber 8 by itself is transportable by highway equipment. Interiorly it is provided with a rack 9 to support ice blocks 11 supplied through hatches 12. The chamber 8 is air tight and is connected to the chamber 6 by means of a pair of air conduits 13 and 14 so that the interior of the chamber 6 is in communication with the interior of the chamber 8. In the usual practice an ice truck periodically furnishes ice through the hatches 12 in between cycles of evacuation of the chambers 6 and 8.

Air and moisture from the interior of the chamber 6 are drawn through the conduits 13 and 14 to the interior of the ice chamber 8 and over the ice therein. This is accomplished by a mechanically driven, positive displacement vacuum pump 16. The pump includes a first stage 17 and a second stage 18 mechanically connected by a drive shaft 19 and both driven through a belt 21 by an internal combustion engine 22 having a radiator 23 thereon. For simplicity some of the various pump connections and interconnections are not shown. It is sufficient to state generally that a duct 26 (Figures 2 and 8) connects the interior of the ice chamber 8 to the vacuum pump 16, preferably through a filter 27. The pump 16 discharges to the atmosphere and is effective when operating to evacuate the chamber 6 and the chamber 8 to the desired extent. During this evacuation process the warm air and moisture withdrawn from the vacuum chamber 6 are cooled and partly condensed by passing over the ice blocks 11. The ice blocks, upon the absorption of the heat, melt and provide a supply of ice water which, with the condensed moisture, trickles down and rests in the bottom of the tube 8.

As often as is neccessary and between cycles of vacuum operation (which normally are from twenty minutes to a half hour in duration) when the apparatus is at atmospheric pressure, an ice water drain line 31 (Figures 1, 4 and 8) is opened by manipulation of a valve 32 so that the ice water from the ice chamber 8 drains by gravity into an ice water sump 33. At the conclusion of the draining operation and when the chambers are again to be evacuated, the valve 32 is again closed. The flow of ice water into the ice water sump 33 is intermittent.

The ice water, instead of being entirely wasted, is collected for further uses. Since customarily the amount of ice melted is in excess of requirements for further heat absorption, the ice water sump tank 33 is provided with an overflow weir 34 so that any level in excess of that indicated by the line 36 in Figure 6 overflows into an outlet 37 to waste.

Ice water from the sump tank 33 destined for further use is pumped into a cooling tank 41. This is accomplished by a centrifugal pump 42 having an inlet pipe 43 extending into the sump tank 33 and being suitably driven by an electric motor 44. The motor is included in an electric circuit (not shown) and is controlled by a switch 46 actuated by a float rod 47 connected to a float within a screened housing 48 in the tank 33. When the ice water in the sump tank 33 rises, the motor 44 is energized. Ice water is withdrawn through the inlet 43 and through the pump 42 to discharge through a pipe 49 into the upper portion of the cooling tank 41. If the pump 42 is not able to keep the level of ice water low enough, then overflow occurs as described. In the event the level is adequately lowered, the float 48 in sinking opens the switch 46 and deenergizes the motor 44. The pump 42 stops and there is no longer transfer of ice water from the sump to the cooling tank 41.

Means are provided for utilizing the ice water as a cooling medium for various exothermic devices such as the vacuum pump 16 and the internal combustion engine 22. For that reason there is provided a constantly driven centrifugal pump 51 (Figures 1 and 7) operated by an electric motor 52. The pump 51 receives a supply of ice water through an inlet 53 connected to the bottom portion (Figures 7 and 8) of the cooling tank 41. The pump 51 discharges through a conduit 54 (Figures 6, 7 and 8) which leads through a T 56 (Figure 6) into a pipe 57 extending through the tank 41 (Figure 1) for a portion of its length and having branches (Figure 1) 58 and 59 extending to the two stages of the vacuum pump 16. If desired, the line 57 may also have a branch 61 extending to the radiator 23 of the engine 22. Since the apparatus is divided into separately portable units, the pipe line 57, at some convenient point in its length, is interrupted by a flexible removable hose 62.

The vacuum pump 16 and the engine 22 are normally provided with jackets 63 and 64 for water cooling. Water received in the jackets, even though it is ice water, is heated by absorption of heat from the exothermic units such as the vacuum pump 16 and the engine 22 and is then returned to the cooling tank 41 by suitable branches 66 and 67 leading into a return line 68. A hose section 69 therein is connected with a return pipe 71 (Figure 1) which passes around much of the inside of the cooling tank 41 and emerges in a section 72 (Figure 6).

From the section 72 the returning warm water has alternate paths governed in accordance with a temperature regulating mechanism. A three way valve 73 is appropriately situated on the side of the cooling tank 41 and has one branch 74 connected to the warm water return line 72. The valve has another branch 76 connected to an overflow conduit 77 leading to a convenient point 78 for the discharge of any overflow released by the valve 73. Another branch 79 of the valve 73 leads downwardly and merges with the inlet pipe 53 for the pump 51 (Figures 7 and 8).

To control the amount and direction of flow through the valve 73 there is provided a power mechanism 81 preferably of a standard sort operated by compressed air derived from a source (not shown) through a pipe line 82. A thermometer bulb 83 in the T 56 is responsive to the temperature of the water flowing outwardly through the pipe 54 and into the supply pipe 57 going to the exothermic unit. The thermostatic bulb 83 transmits its impulse or signal through a line 84 to a control valve 86. This has the property of regulating the flow of air through the line 82 to the valve 81 exactly in accordance with the temperature of the thermostatic bulb 83. Thus, the valve 73 is positioned in such a way as to mix or divert the warm water returning through the conduit 72. The effect of this mixture or diversion is to provide in the pipe 54 a mixture of ice water and warmed water returning to the exothermic devices. The temperature of the returning or cooling water is thus maintained at substantially a set, optimum value.

In the event there is excessive warm water, it is diverted through the overflow 78 to waste, whereas if the thermostatic bulb 83 so requires, much or all of the returned, warmed water is again fed through the pump 51 to be recirculated to the vacuum pump 16 and, if connected, also to the internal combustion engine 22. The temperature of the water going to the vacuum pump (and to the internal combustion engine) is maintained at a preferred, optimum value.

This arrangement is of particular value in starting the mechanism from cold since the initially warmed ice water is quickly recirculated without substantial admixture of water from the tank 41 until such time as it comes up to a temperature effective upon the thermostatic bulb 83 and the valve 73. Above that temperature there is an increasing admixture of ice water so that when the mechanism has gotten hot and requires greater cooling greater amounts of ice water are used for that purpose.

Pursuant to the invention there is provided a vacuum cooling apparatus which is substantially self-contained since no supply of cooling water for the vacuum pump and for the internal combustion engine is necessary other than that provided by the melted ice. Since the internal combustion engine provides the necessary power for the apparatus it can be operated in any remote area. The ice blocks are trucked in periodically and fuel for the engine is likewise trucked in. Furthermore, the apparatus when dismantled can readily be trucked to a new location and there set up and operated under widely variant conditions of load, that is light load, or heavy load, and under widely variant ambient temperature conditions. A greatly improved apparatus is thus afforded.

What is claimed is:

1. A vacuum cooling apparatus comprising a vacuum chamber, a vacuum pump connected to said chamber for reducing the pressure therein, a water jacket on said pump, a cooling water tank, an ice chamber connected between said vacuum chamber and said vacuum pump, means for transferring ice water from said ice chamber to said water tank, means for supplying water from said tank to said jacket, means for returning water from said jacket to said tank, and means responsive to temperature of water in said supplying means for mixing therewith water from said returning means.

2. A vacuum cooling apparatus comprising a vacuum chamber, an ice chamber, a water cooled vacuum pump, means for connecting said pump to said chambers for drawing air from said vacuum chamber through said ice chamber whereby said ice melts to form ice water, a cooling tank, means for transferring said ice water to said cooling tank, means for supplying said vacuum pump with cooling water, means for furnishing said supplying means with ice water from said cooling tank and with cooling water returned from said vacuum pump, and means responsive to temperature of the water flowing in said supplying means for proportioning said ice water and said cooling water furnished said supplying means.

3. A vacuum cooling apparatus comprising a vacuum chamber, an ice chamber, an air conduit connecting said chambers, a water cooled vacuum pump, a duct connecting said ice chamber and said vacuum pump, a sump tank, means for conducting ice water from said ice chamber to said sump tank, a cooling tank, means for transferring ice water from said sump tank to said cooling tank, a water pump, means for connecting said cooling tank and the inlet of said water pump, a pipe connecting the outlet of said water pump to the cooling mechanism of said vacuum pump, a conduit joining the cooling mechanism of said vacuum pump to said connecting means, an overflow line, a valve in said conduit and joined to said overflow line, and means responsive to temperature in said pipe for operating said valve to divert flow in said conduit into said overflow line.

4. A vacuum cooling apparatus comprising a vacuum chamber adapted to have moisture therein, a vacuum pump connected to withdraw air and moisture from said vacuum chamber, means for passing said air and moisture over ice resulting in a supply of cold water including melted ice and said moisture, means utilizing heat from said vacuum pump for heating said cold water, and means for recirculating some of said heated water through said utilizing means.

References Cited in the file of this patent

UNITED STATES PATENTS

| | | |
|---|---|---|
| 221,122 | Bate | Dec. 2, 1879 |
| 864,990 | Richards et al. | Sept. 3, 1907 |
| 2,009,949 | Williams | July 30, 1935 |
| 2,238,808 | Dube et al. | Apr. 15, 1941 |
| 2,315,221 | Philipp | Mar. 30, 1943 |
| 2,612,310 | Eggman | Sept. 20, 1953 |